United States Patent [19]
Sandford et al.

[11] Patent Number: 5,671,646
[45] Date of Patent: Sep. 30, 1997

[54] TUBE END SQUARING TOOL

[75] Inventors: William E. Sandford, Camino; Henry Astle, Rancho Cordova, both of Calif.

[73] Assignee: TRI Tool Inc., Rancho Cordova, Calif.

[21] Appl. No.: 500,148

[22] Filed: Jul. 10, 1995

[51] Int. Cl.[6] ................................. B23B 5/16
[52] U.S. Cl. ................................. 82/113
[58] Field of Search ............... 82/113, 128; 408/104, 408/105, 136, 124

[56] References Cited

U.S. PATENT DOCUMENTS

| | | |
|---|---|---|
| 3,228,268 | 1/1966 | Strout . |
| 3,875,831 | 4/1975 | Beauloye . |
| 4,364,290 | 12/1982 | Astle ................. 82/113 |
| 4,365,528 | 12/1982 | Astle ................. 82/113 |
| 4,459,883 | 7/1984 | Astle ................. 82/113 |
| 4,486,129 | 12/1984 | Vowel ............... 408/104 |
| 4,655,108 | 4/1987 | Galos ................ 82/113 |
| 4,739,682 | 4/1988 | Birkestrand ........ 82/113 |
| 4,955,263 | 9/1990 | Vanderpol et al. . |
| 5,083,484 | 1/1992 | Vanderpol et al. . |

Primary Examiner—M. Rachuba
Assistant Examiner—Kenneth J. Hansen
Attorney, Agent, or Firm—Bacon & Thomas

[57] ABSTRACT

A portable tool for use in axially cutting and squaring ends of tubes includes a main tool body within which is rotatably mounted a tool shaft having a cutting tool attached at one end thereof, a tube receiving and clamping unit for retaining an end portion of a tube to be worked upon, a mechanism for shifting the tool shaft relative to the main tool body so that the cutting tool can progressively engage the end portion of the tube and a power drive unit for rotating the tool shaft. The tube receiving and clamping unit is provided with a plurality of circumferentially spaced ports which provides viewing access to a cutting zone, enables adjustments to or changing of the cutting tool and permits chips cut from the tube to be readily removed from within the tool. The shifting mechanism includes a camming arrangement that ensures smooth shifting of the tool shaft and which is designed to minimize the ingress of foreign matter into the tool. In addition, the power drive unit can be advantageously secured on opposing sides of the main tool body.

17 Claims, 5 Drawing Sheets

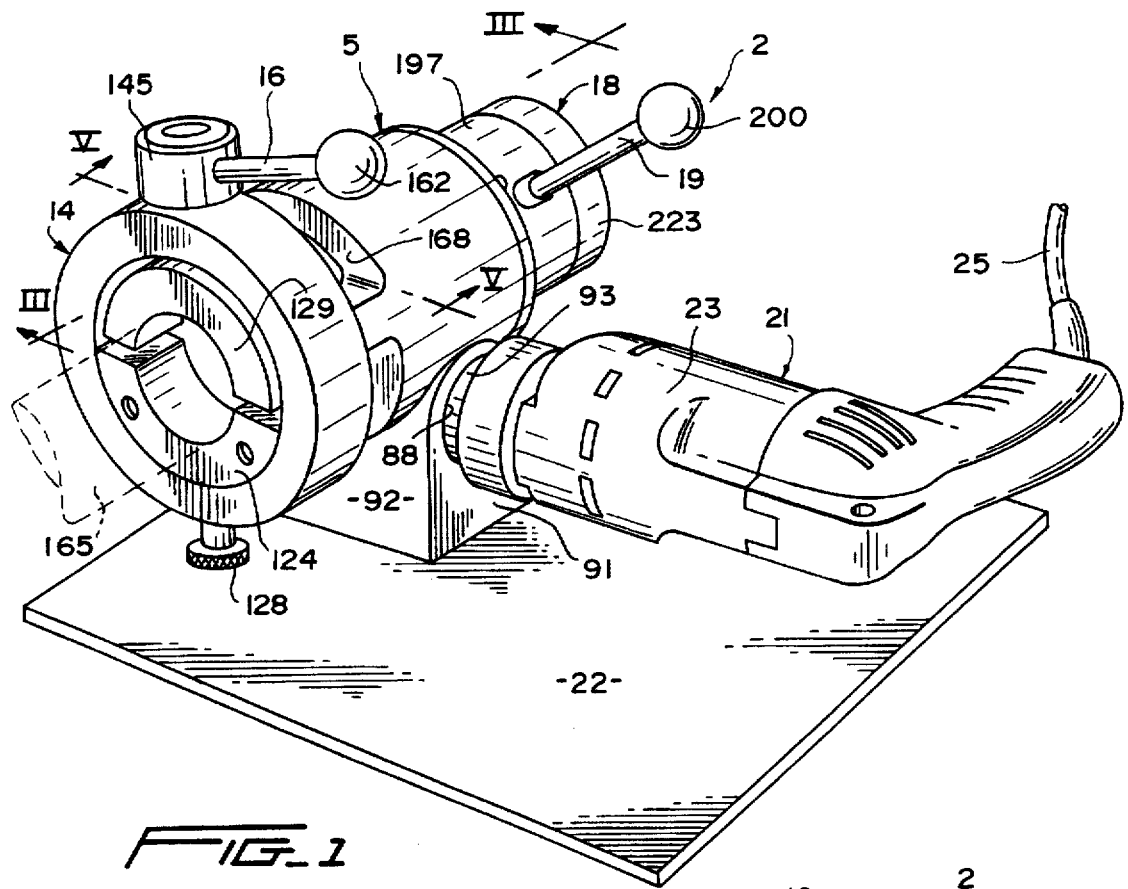
FIG_1
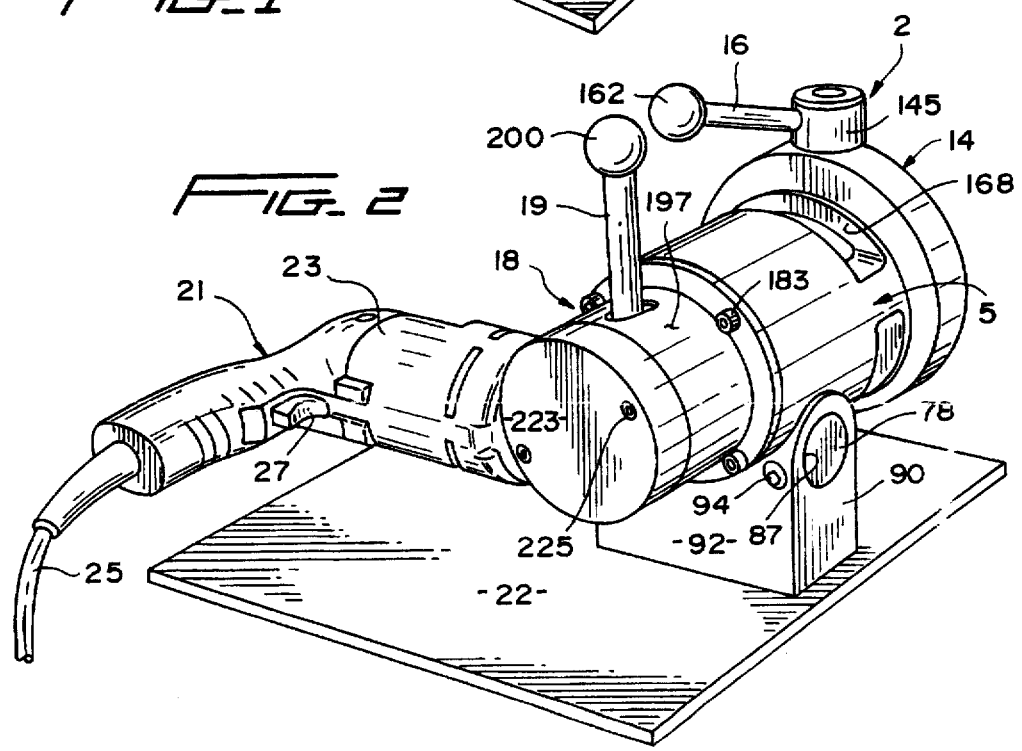
FIG_2

5,671,646

TUBE END SQUARING TOOL

BACKGROUND OF THE INVENTION

1. Field of the Invention

The present invention pertains to the art of cutting tools and, more particularly, to a portable tool for squaring the ends of tubes in preparation for attaching the tubes, such as by welding, in an end-to-end manner.

2. Discussion of the Prior Art

It is common practice in various fields to remove burrs and/or rough edges from tube ends which are to be welded or otherwise secured together in an end-to-end relationship. Often, such square ended tubes, if metal, are welded together by automatic butt welders and therefore it is extremely important that the ends of the tubes be properly squared in order to assure a complete and uniform connection.

Although it is common to square tube ends with a bench milling machine, it is often necessary to square the ends of tubes at a remote site or in a confined working space. For this purpose, various portable tube end squaring tools have been developed as represented by the portable cutting tools disclosed in U.S. Pat. Nos. 3,228,268 and 4,655,108. In general, such known portable cutting tools include a main body within which is rotatably mounted a power driven tube cutter, a mechanism for clamping an end of a tube to be squared and a device for selectively shifting the tube cutter into and out of engagement with the end of the tube.

Although such known portable tube end cutting tools function satisfactorily, there still exists a need in the art for a portable tube end squaring tool that is compact, versatile and which facilitates the operation thereof by, for example, providing readily accessible controls.

SUMMARY OF THE INVENTION

The present invention provides a tube end cutting tool including a tool shaft rotatably mounted within a main tool body, a tube receiving and clamping unit and a mechanism for shifting the tool shaft relative to the main tool body so that a cutting tool carried by one end of the tool shaft progressively engages and cuts an end of a tube secured within the tube receiving and clamping unit.

More specifically, the tool shaft is rotatably mounted through multiple bearing units located within the main tool body and is interconnected with a power drive unit through a spline connection which permits the shaft to shift longitudinally within the main tool body. The power drive unit can be selectively positioned on opposing lateral sides of the main tool body depending on the user's particular preference or as required due to space or other constrictions during use. The tube receiving and clamping unit includes a collet which can be selectively manipulated to grasp or release an end portion of a tubular workpiece. The tool shaft is rotatable relative to an inner sleeve member of the shifting mechanism but is attached to the inner sleeve member such that manual movement of an actuating handle, secured to the inner sleeve member, can be used to adjust the longitudinal position of the tool shaft. The inner sleeve member is actually rotatably and shiftably positioned within an outer sleeve member secured to the main tool body. The actuating handle extends through a camming slot formed in the outer sleeve member such that the actuating member is guided during movement. The actuating handle also extends through a longitudinally extending slot provided in a protective cover sleeve that is freely rotatably positioned about the outer sleeve member.

The tube receiving and clamping unit incorporated in the cutting tool of the invention is preferably provided with a plurality of circumferentially spaced ports that provide access to a cutting zone into which the cutting tool is adapted to extend and enable cut pieces of the tube to be removed.

Additional features and advantages of the cutting tool of the present invention will become more readily apparent from the following detailed description of a preferred embodiment thereof when taken in conjunction with the following drawings wherein like reference numerals refer to corresponding parts in the several views.

BRIEF DESCRIPTION OF THE DRAWINGS

FIG. 1 is a perspective view of the tube end squaring tool of the invention.

FIG. 2 is another perspective view of the tube end squaring tool of FIG. 1.

DETAILED DESCRIPTION OF THE PREFERRED EMBODIMENT

Figure 3:
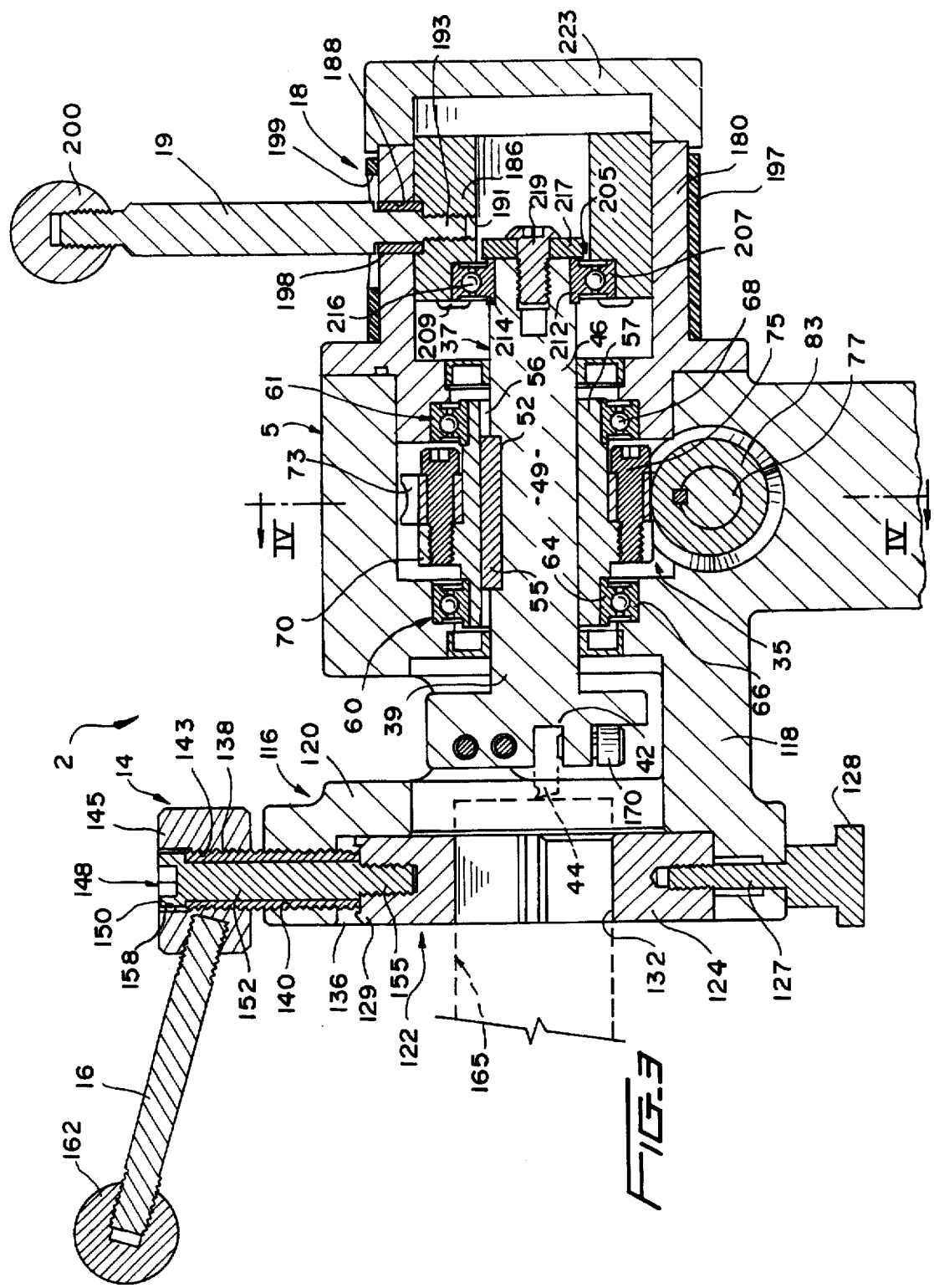
FIG. 3 is a cross-sectional view generally taken along lines III—III of FIG. 1.

With initial reference to FIGS. 1 and 2, the tube end squaring tool of the present invention is generally indicated at 2 and comprises a main tool body 5 that is generally cylindrical in shape, a tube receiving and clamping unit 14 which is formed at a first end of main tool body 5 and adjusted through a clamping arm 16, a shifting unit 18 that is controlled by means of an actuating member in the form of a manually engageable handle 19 and a power drive unit 21. In order to adequately support tool 2 during operation, main tool body 5 is preferably secured to a base plate 22. Power drive unit 21 includes a housing 23 that, in the preferred embodiment, incorporates an electric motor (not shown) that receives power through a cord indicated at 25. The electric motor is preferably capable of outputting various speeds in dependence upon the force manually applied to trigger switch 27. The particular internal structure and operation of power drive unit 21 is not considered part of the present invention and therefore will not be further discussed in detail herein.

With reference to FIG. 3, main tool body 5 includes an internal cavity 35 through which a tool shaft 37 extends. Tool shaft 37 includes a first longitudinal end portion 39 terminating a tool carrier 42 that is adapted to support a selectively removable cutting tool 44, a second longitudinal end portion 46 and an intermediate portion 49. Intermediate portion 49 is formed with a keyed section 52 that is rotatably coupled by means of a keying member 55 to a splined section 56 of a drive sleeve 57. Drive sleeve 57 is rotatably supported by main tool body 5 by first and second bearing units 60 and 61. Each bearing unit 60, 61 includes an inner race 64 carried by drive sleeve 57, an outer race 66 carried by main tool body 5 within internal cavity 35 and a plurality of roller members 68 interposed between inner and outer races 64, 66. Drive sleeve 57 is also formed with an annular flange 70 to which is secured a gear 73 by means of a plurality of circumferentially spaced fasteners, one of which is shown at 75. In the preferred embodiment, gear 73 comprises a worm gear and fasteners 75 are threadably received in annular flange 70.

Figure 4:
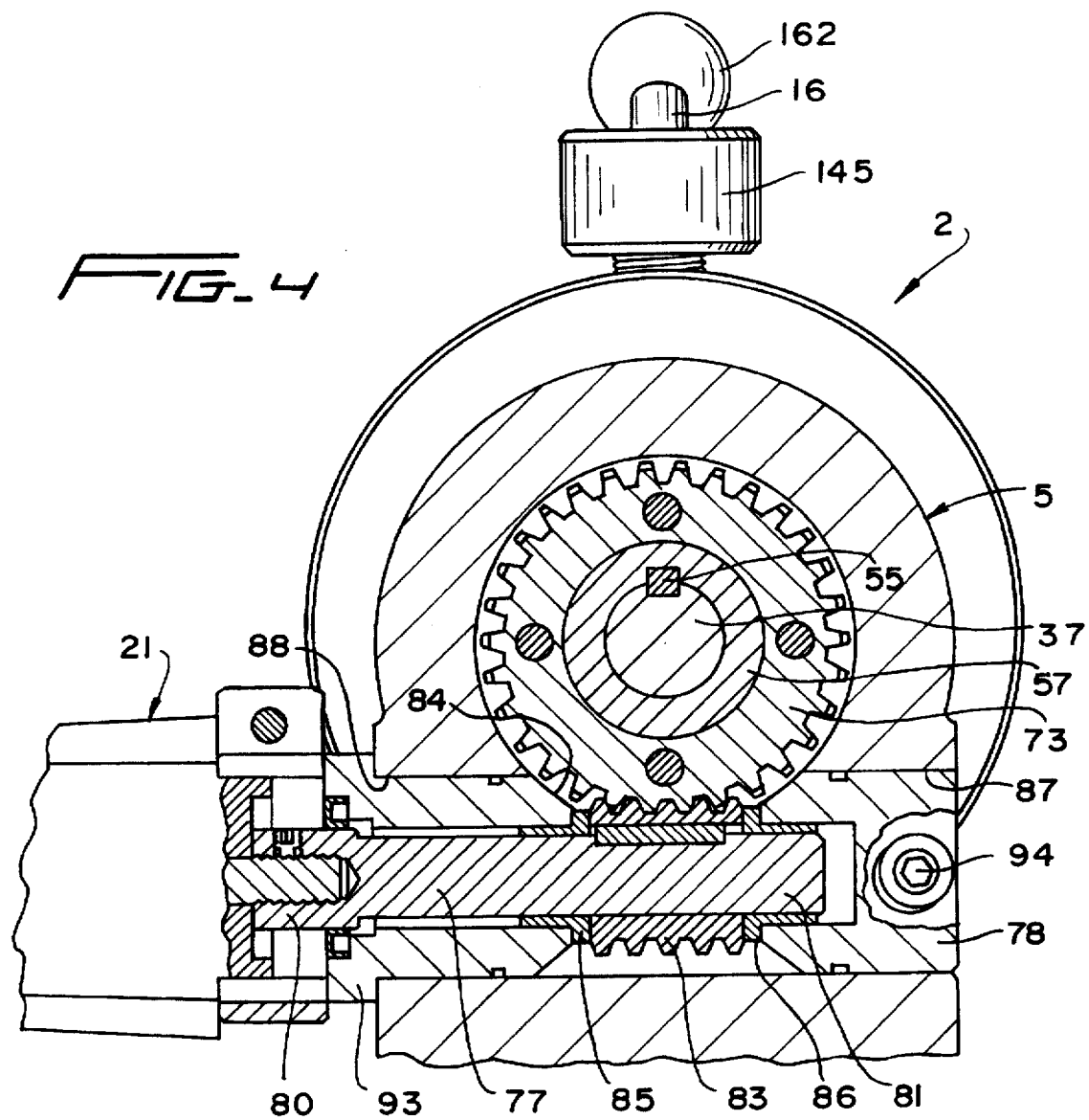
FIG. 4 is a partial cross-sectional view taken along lines IV—IV of FIG. 3.

As best shown in FIG. 4, power drive unit 21 includes an output shaft 77 that is rotatably mounted within housing extension 78 of power drive unit 21. Output shaft 77 includes a support portion 80 and terminates in a distal end portion 81. Output shaft 77 also has a drive gear 83 spline connected for rotation therewith between distal end 81 and support portion 80. Drive gear 83 extends through an opening 84 provided in housing extension 78 and is axially retained relative to output shaft 77 by means of axially spaced bearing sleeves 85, 86. As shown, drive gear 83 is interengaged with gear 73 and together define a worm gear set. Of course, it should be readily realized that other types of drive transmission arrangements could be utilized including the use of a helical gear set. Through this drive arrangement, actuation of power drive unit 21 by means of trigger switch 27 causes rotation of output shaft 77, drive gear 83 and, through its interconnection with drive gear 83 by means of drive sleeve 57 and gear 73, tool shaft 37.

As best shown in FIGS. 1, 2 and 4, a pair of aligned apertures 87 and 88 are respectively formed in opposing sides 90 and 91 of a support base 92 of main tool body 5. In the preferred embodiment shown, apertures 87 and 88 have equal diameters which are slightly greater than the diameter of housing extension 78 of power drive unit 21. With this arrangement, power drive unit 21 can be supported on either side 90, 91 of support base 92 by initially inserting output shaft 77, drive gear 83 and housing extension 78 within a desired one of aligned apertures 87, 88. The degree of insertion within main tool body 5 is limited by an annular flange 93 formed as part of housing extension 78 (see FIGS. 4) and housing extension 78 is retained in a desired position by means of set screw 94 that extends through support base 92 and into housing extension 78.

Figure 5:
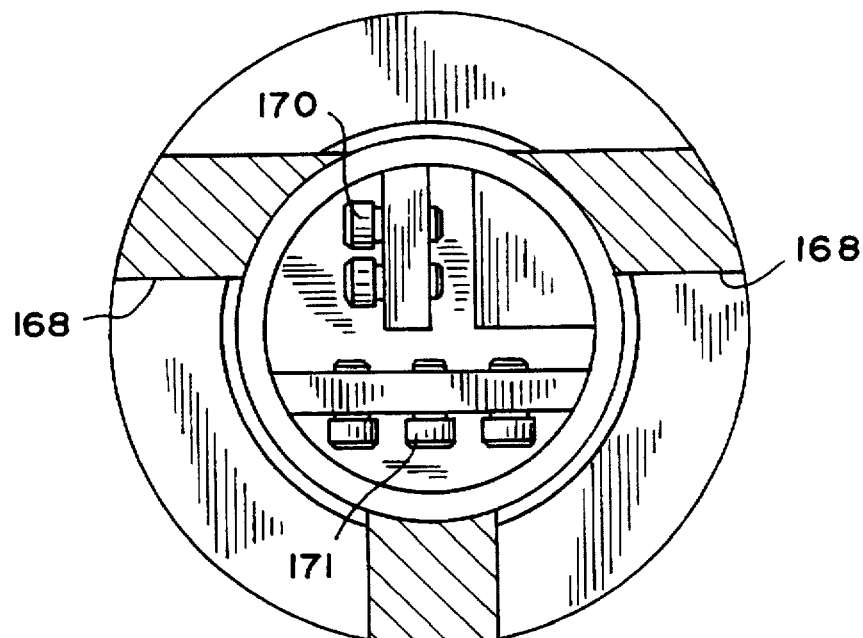
FIG. 5 is a partial cross-sectional view generally taken along lines V—V of FIG. 1.
Figure 6:
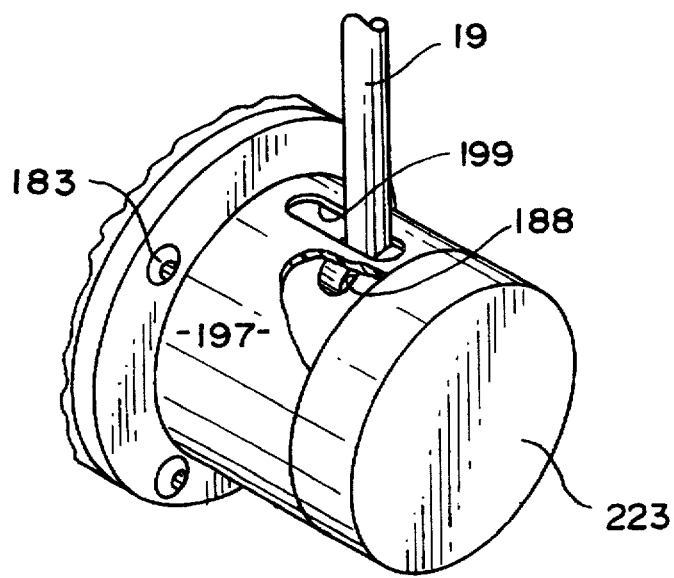
FIG. 6 is a partial perspective view of a shifting unit incorporated in the tube end squaring tool of the invention.
Figure 7:
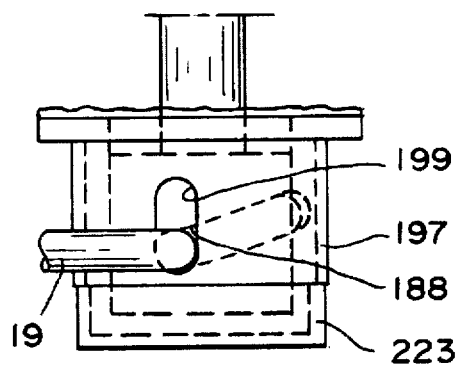
FIG. 7 schematically depicts, in a top view, the shifting unit of FIG. 6 in a first operational position.
Figure 8:
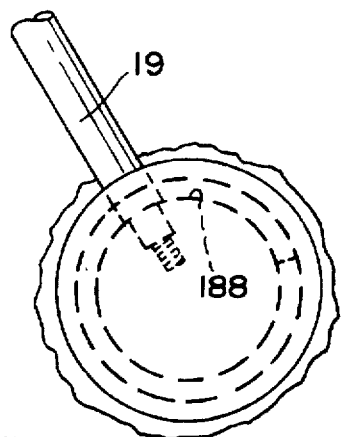
FIG. 8 schematically depicts, in a side view, the shifting unit of FIG. 6 in its first operational position.
Figure 9:
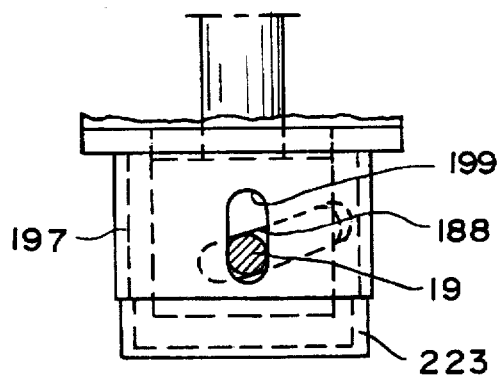
FIG. 9 schematically depicts, in a top view, the shifting unit of FIG. 6 in a second operational position.
Figure 10:
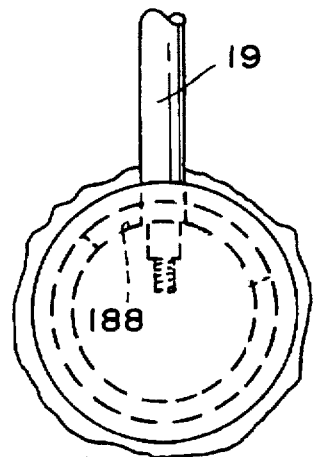
FIG. 10 schematically depicts, in a side view, the shifting unit of FIG. 6 in its second operational position.
Figure 11:
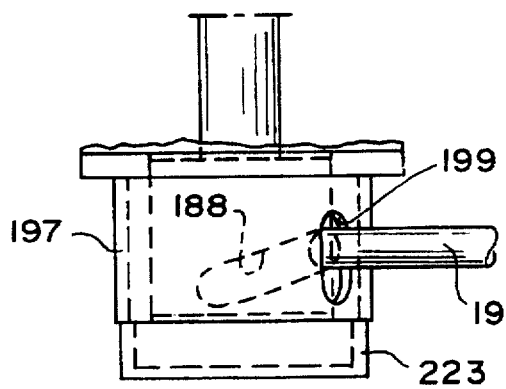
FIG. 11 schematically depicts, in a top view, the shifting unit of FIG. 6 in a third operational position.
Figure 12:
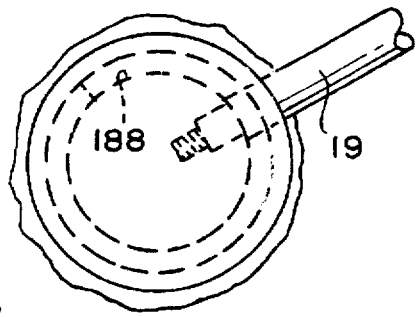
FIG. 12 schematically depicts, in a side view, the shifting unit of FIG. 6 in its third operational position.

As best shown in FIGS. 1, 3 and 5, tube receiving and clamping unit 14 is preferably integrally casted as part of main tool body 5 and includes a hollow housing portion 116 having a first end section 118 adjacent the attachment of power drive unit 21 to main tool body 5 and a second end section 120. Second end section 120 is provided with a tube clamp defined by a collet 122 formed from a first arcuate clamping member 124 that is secured to housing portion 116 by means of a threaded fastener 127 having a manually engageable head 128 and a second arcuate clamping member 129. First arcuate clamping member 124 and second arcuate clamping member 129 collectively define a centrally located tube receiving aperture 132 that opens toward cutting tool 44.

Second arcuate clamping member 129 is adapted to be shifted relative to first arcuate clamping member 124 in order to selectively adjust the size of tube receiving aperture 132. For this purpose, second arcuate clamping member 129 is positioned within housing portion 116 with a radial clearance 136 therebetween as best shown in FIG. 3. Second arcuate clamping member 129 is adapted to be shifted to adjust the size of tube receiving aperture 132 by the manual rotation of clamping arm 16. The specific interconnection between clamping arm 16 and second arcuate clamping member 129 will be discussed more fully below.

As shown in FIG. 3, tube receiving and clamping unit 14 includes an externally threaded sleeve 138 that is threadably received within a bore 140 formed in second end section 120 of housing portion 116. Threaded sleeve 138 is also threadably received within an aperture 143 formed in a base 145 of clamping arm 16 and is non-rotatably secured to base 145 by any means known in the art such as a pin (not shown). A bolt 148, including a head 150, a shank 152 and a threaded end 155, is provided to interconnect clamping arm 16 and second arcuate clamping member 129 such that rotation of clamping arm 16 results in radial displacement of second arcuate clamping member 129 and a change in the size of tube receiving aperture 132. More specifically, shank 152 of bolt 148 extends through threaded sleeve 138 and threaded end 155 is secured within second arcuate clamping member 129, while head 150 extends within a recess 158 of base 145 and engages an upper end (not labeled) of threaded sleeve 138.

With this arrangement, threaded sleeve 138 is permitted to rotate, about shank 152 of bolt 148, in unison with clamping arm 16 relative to both second end section 120 of housing portion 116 and second arcuate clamping member 129. The relative rotation between threaded sleeve 138 and housing portion 116 due to their threaded engagement will cause second arcuate clamping member 129 to shift relative to first arcuate clamping member 124 so as to adjust the size of tube receiving aperture 132. For ease of rotation, clamping arm 16 is preferably formed with a gripping portion 162 in the form of a ball that is threadably or otherwise secured to clamping arm 16. Therefore, when an end portion of a tube 165 is positioned within the tube receiving aperture 132 between first and second arcuate clamping members 124 and 129, clamping arm 16 can be rotated to cause tube 165 to be rigidly fixed between first and second arcuate clamping portions 124 and 129.

First end section 118 of housing portion 116 is provided with a plurality of circumferentially spaced ports 168. Ports 168 are provided in order to enable the cutting zone within housing portion 116 to be viewed, to permit the removal of pieces of tube 165 developed during operation of tube end squaring tool 2 and to provide access to two sets of screws 170 and 171 used to mount cutting tool 44 to tool carrier 42. Cutting tool 42, although not actually shown in full view, has a cutting head supporting base that is generally T-shaped such that both screw sets 170 and 171 engage a portion of the supporting base while permitting the cutting element of cutting tool 42 to project axially from end portion 39 of tool shaft 37 as best shown in FIG. 3.

Shifting unit 18 used to position tool shaft 37 relative to main tool body 5 such that cutting tool 44 can selectively engage the end of tube 165 will now be described with particular reference to FIGS. 2, 3 and 6-12. Shifting unit 18 includes an outer sleeve member 180 which is fixedly secured to main tool body 5 by means of a plurality of fasteners 183 (see FIGS. 2 and 6) and an inner sleeve member 186 that is slidably and rotatably mounted within outer sleeve 180. Outer sleeve member 180 is formed with an angled slot 188 extending therethrough as best seen in the partial cutaway portion of FIG. 6 and in phantom in FIGS. 7, 9 and 11. On the other hand, inner sleeve member 186 is formed with a threaded hole 191 that threadably receives an end portion 193 of manually engageable actuating handle 19.

As clearly shown in these referenced figures, actuating handle 19 projects through angled slot 188 and also through a cover sleeve 197 that is rotatably mounted about outer sleeve member 180. Actually activating handle 19 includes a reduced diameter portion (not labeled) about which is provided a bearing ring 198 which is located within slot 188 and atop inner sleeve member 186. More specifically, cover sleeve 197 is provided with a longitudinal slot 199 through which actuating handle 19 extends. The length of slot 188 in the longitudinal direction is substantially equal to the longitudinal length of slot 199. In addition, the longitudinal length of slot 188 defines the total permissible longitudinal shifting of inner sleeve member 186 relative to outer sleeve member 180, as well as the shifting range of cutting tool 44 as will be more fully discussed below. FIGS. 7-12 are seen to clearly depict the complete range of movement of actuating handle 19 within slots 188 and 199. In essence, slot 188 defines a camming guide for actuating handle 19 and cover sleeve 197 is provided for safety reasons and to minimize the ingress of any foreign matter into inner sleeve member 186 through slot 188. For ease of manipulation of actuating handle 19, a manually engageable knob 200 is threadably secured thereto as clearly shown in FIGS. 1-3.

In order for rotation and axial shifting of inner sleeve member 186 relative to outer sleeve member 180 by means of actuating handle 19 to translate into longitudinal shifting of tool shaft 37 relative to main tool body 5, inner sleeve member 186 is interconnected with tool shaft 37 through a bearing unit 205 (see FIG. 3). More specifically, bearing unit 205 includes an outer race 207 that is secured to inner sleeve member 186 by means of a retaining fastener 209, an inner race 212 that is positioned against an annular ledge portion 214 formed in second longitudinal end portion 46 of tool shaft 37 and a plurality of roller members 216 that are interposed between inner and outer races 212 and 207 respectively. In the preferred embodiment, inner race 212 is secured against annular ledge portion 214 of tool shaft 37 by means of a retaining element 217 that abuts inner race 212. Retaining element 217 is secured to second longitudinal end portion 46 by means of a bolt 219. Bolt 219 can be readily accessed through inner sleeve member 186 as best seen in FIG. 3 when an end cap 223, which is adapted to close the end of shifting unit 18 remote from main tool body 5, is removed. End cap 223 can be snap-fit or fixedly secured to outer sleeve member 180 by means of threaded fasteners such as those shown at 225 in FIG. 2 for this purpose.

With this arrangement, in particular the mounting and drive arrangement associated with tool shaft 37 as well as the structure of shifting unit 18 and its interconnection with tool shaft 37, tube end squaring tool 2 defines a compact and versatile tool that can be smoothly and safely operated by altering the positions of only a few, readily accessible control members.

Although described with respect to a preferred embodiment of the invention, it is to be readily understood that various changes and/or modifications can be made to the tool of the present invention without departing from the spirit thereof. For example, although the invention has been particularly described for use in squaring the ends of tubes, it should be readily understood that various cutters could be utilized with the tool of the present invention in order to perform various other cutting operations on a metal tube such as tapering or chamfering a tube end. In addition, the tool can be utilized to square off, taper or chamfer plastic tubes as well, using appropriate cutters as needed. In general, the invention is only intended to be limited by the scope of the following claims.

We claim:

1. A portable tool for performing a cutting operation on an end of a tube comprising:

a main tool body defining an internal cavity extending between first and second opposing, open sides thereof;

a tool shaft extending within said internal cavity, said tool shaft including a first longitudinal end portion defining a tool carrier adapted to support a tube end cutter tool, a second longitudinal end portion and an intermediate portion;

means for rotatably supporting said tool shaft within said internal cavity;

a drive unit drivingly connected to said tool shaft for selectively rotating said tool shaft relative to said main tool body;

a tube receiving and clamping unit carried by the first side of said main tool body, said tube receiving and clamping unit including a tube receiving aperture that opens into said internal cavity, said tube receiving aperture being defined by a least first and second clamping members that are selectively movable relative to one another to adjust the side of said tube receiving aperture such that an end of a tube to be cut can be inserted within said tube receiving aperture and said clamping members can be shifted in order to clamp an end portion of the tube within said tube receiving aperture; and a mechanism for shifting said tool shaft within said internal cavity, said shifting mechanism including an outer member fixed to the second side of said main tool body and an inner member slidably mounted within said outer member, said inner member being connected to the second longitudinal end portion of said tool shaft for relative rotation with respect to said tool shaft, wherein sliding movement of said inner member causes said tool shaft to be longitudinally shifted so as to enable a cutter tool supported by said tool carrier and rotated by said drive unit to progressively engage and cut an end of a tube secured within said tube receiving aperture; said shifting mechanism including cam means, acting between said inner and outer members, for rotating and sliding said inner member relative to said outer member.

2. The tube cutting tool as claimed in claim 1, wherein said inner member is also rotatably mounted within said outer member.

3. The tube cutting tool as claimed in claim 2, further including a first bearing assembly between said inner member and the second longitudinal end portion of said tool shaft, said first bearing assembly directly translating the sliding movement of said inner member into longitudinal shifting of said tool shaft.

4. The tube cutting tool as claimed in claim 3, wherein said first bearing assembly comprises an inner race attached to the second longitudinal end portion of said tool shaft, an outer race attached to the inner member and a plurality of roller members interposed between said inner and outer races.

5. The tube cutting tool as claimed in claim 4, further including a retaining element removably secured to the second longitudinal end portion of said tool shaft, said retaining element securing said inner race to said tool shaft.

6. The tube cutting tool as claimed in claim 2, wherein said tube receiving and clamping unit defines an internal cutting zone into which the first longitudinal end portion of said tool shaft is adapted to extend, said tube receiving and clamping unit including a housing portion including at least one port extending therethrough and opening into said cutting zone.

7. The tube cutting tool as claimed in claim 6, wherein said housing portion is provided with a plurality of circumferentially spaced ports.

8. The tube cutting tool as claimed in claim 1, wherein said cam means comprises an angled slot extending through a portion of said outer member and an actuating member extending through said slot and being fastened to said inner member such that movement of said actuating member within said slot causes said inner member to rotate and slide relative to said outer member.

9. The tube cutting tool as claimed in claim 8, further including a cover sleeve extending about and being rotatable relative to said outer member, said cover sleeve including a longitudinally extending slot through which said actuating member extends.

10. The tube cutting tool as claimed in claim 9, wherein said actuating member comprises a manually engageable handle.

11. The tube cutting tool as claimed in claim 1, wherein said drive unit includes a drive sleeve, positioned within said internal cavity, through which said tool shaft extends, said drive sleeve being drivingly connected to the intermediate portion of said tool shaft.

12. The tube cutting tool as claimed in claim 11, wherein said drive sleeve is a spline connected to the intermediate portion such that said tool shaft can longitudinally shift relative to said drive sleeve.

13. The tube cutting tool as claimed in claim 11, wherein said means for rotatably supporting said tool shaft within said internal cavity includes at least one bearing unit acting between said main tool body and said drive sleeve.

14. The tube cutting tool as claimed in claim 11, wherein said drive unit further includes a power drive unit having an output shaft, a drive gear carried by said output shaft and a driven gear carried by said drive sleeve and meshing with said drive gear.

15. The tube cutting tool as claimed in claim 14, wherein said main tool body further includes third and fourth sides, said third and fourth sides being formed with aligned apertures aligned along an axis extending generally perpendicular to and opening into said internal cavity, said output shaft being selectively received within said main tool body through either one of said aligned apertures.

16. The tube cutting tool as claimed in claim 15, further including a housing extension carried by said drive unit and within which said output shaft is located, said housing extension being removable received in a selected one of said apertures.

17. The tube cutting tool as claimed in claim 16, further including fasteners means for removably securing said housing extension to said main tool body.

* * * * *